UNITED STATES PATENT OFFICE.

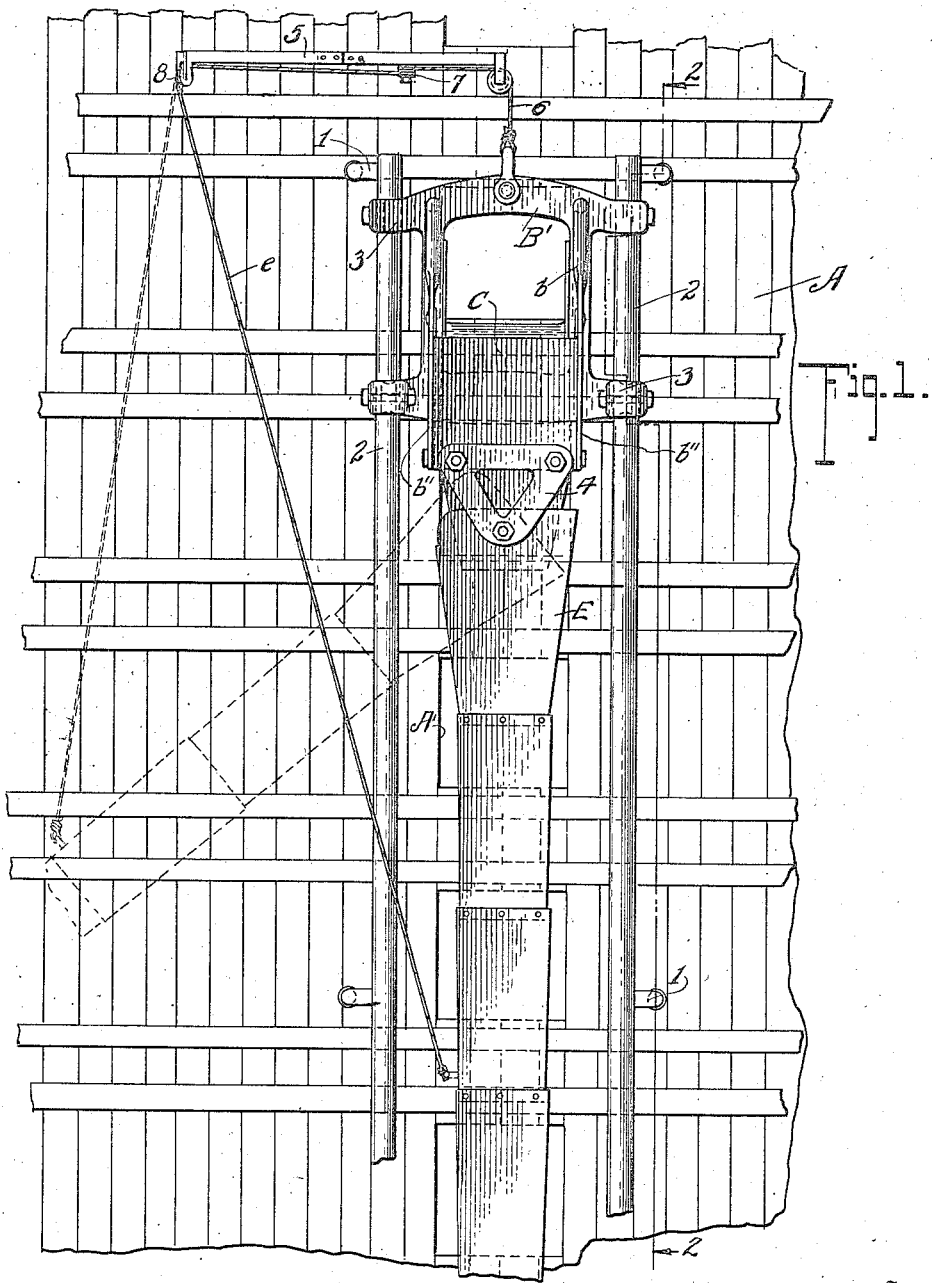

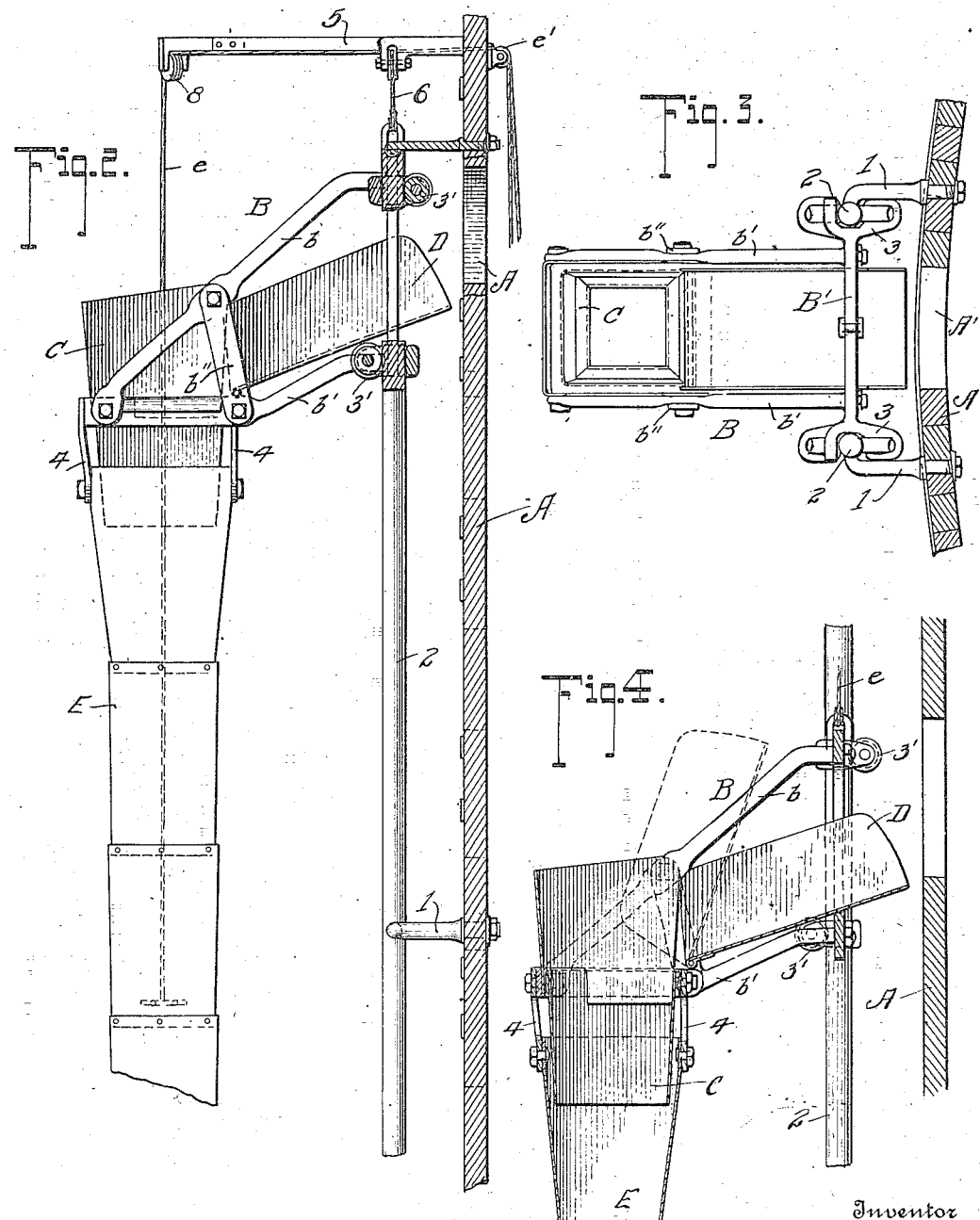

EDGAR J. VASEY, OF COZAD, NEBRASKA.

DISCHARGE MEANS FOR SILOS, &c.

1,127,324.  Specification of Letters Patent.  Patented Feb. 2, 1915.

Application filed April 11, 1914. Serial No. 831,254.

*To all whom it may concern:*

Be it known that I, EDGAR J. VASEY, a citizen of the United States, residing at Cozad, in the county of Dawson and State of Nebraska, have invented certain new and useful Improvements in Discharge Means for Silos, &c., of which the following is a specification.

The object of this invention has been to devise improved means for facilitating the removal of ensilage from silos.

The invention comprehends the provision at intervals vertically of the silo of openings by which access may be had to the contents of the container as the ensilage therein is gradually reduced in quantity by removal. Located opposite to the said openings is a vertically movable carriage mounted on rails or guides and supporting a chute adapted to be positioned by the said support opposite a selected one of the openings in the wall of the silo. In association with the chute is a hopper to receive the material passing along the chute and with which hopper is connected a conduit of extensible structure preferably and adjustable to assume positions permitting of the discharge of the ensilage or contents of the receptacle into a vehicle or other carrier as may be desired.

A complete understanding of the invention and the advantages of the same under practical conditions of service will be obtained on reference to the following description and the accompanying drawings in which:—

Figure 1 is a fragmentary view of the side of a silo of conventional construction showing the discharge means embodying the present improvements. Fig. 2 is a sectional view vertically of the said means taken about on the line 2—2 of Fig. 1. Fig. 3 is a horizontal sectional view. Fig. 4 is a sectional view taken through the chute, the hopper and the upper portion of the conduit, dotted lines showing the chute in upraised position to permit the passing by way of the opening of a person, the hopper being spaced quite a distance from the guides for this purpose.

A in the drawings denotes the silo and it is to be understood that within the purview of the invention the latter may be readily used in connection with containers other than silos such as large bins and even buildings utilized for storing grain or similar purposes. At intervals vertically of the silo are located openings A' and through which openings the contents of the silo may be removed conveniently. Opposite the portion of the wall of the silo having the openings A' is a support or carriage B mounted to operate longitudinally of rails or guides 2 carried by the supporting brackets 1. The support B consists of a frame B' located between the guides 2 and formed at opposite portions with the curved arms 3 between the rear ends of which at the upper portion of the frame are mounted rollers 3' adapted to engage with the guides 2 at the rear of the latter. In like manner, at the lower portion of the frame B' and intermediate the front portions of the arms 3 and the guides 2 are other rollers 3'. The latter rollers operate on the front sides of the guides 2. Offstanding from the frame B', are the spaced downwardly inclined arms $b$ and the lower offstanding arms $b'$, said arms being connected together by means of plates or bars $b''$. The outer ends of the arms $b$ and $b'$ support a somewhat square shaped frame $c'$ which carries a hopper C thereon, the inner wall of the hopper being cut away at the upper portion so as to readily permit of passing into the hopper materials supplied thereto from the chute D. The chute D is pivoted at its lower or outer end to the frame $c'$ so that the chute may be moved into an approximately vertical position as shown in dotted lines in Fig. 4, or may assume the inclined position shown in full lines wherein the chute extends from the hopper C over to one of the openings A' of the silo. Owing to the fact that the hopper C is spaced a considerable distance from the wall of the silo A by the special construction of the support or carriage B, it is apparent that the operator may readily climb a ladder and pass through the space between the arms $b$ and $b'$ by raising the chute D into the dotted line position in Fig. 4.

The location of the rollers 3' operating along the guides 2 is such as to render the movement of the carriage or support B very easy and for the purpose of effecting such movement in order to position the chute D opposite any desired one of the various openings A' suitable hoisting means is provided. The hoisting means preferably consists of a rope 6 connected to the upper portion of the frame B' of the support B and passing over a roller carried by an arm 5 projecting from the silo. The rope or cable 6 then passes around a double pulley 7 on the arm 5 through the wall of the silo and over a pulley $e'$. By exerting a pull on the rope 6 it will be apparent that the carriage or movable support B may be raised or lowered and thus positioned at a suitable point in the length of the guides 2, the rope being secured to any suitable part in order to hold the support B at the desired adjustment. Projecting downwardly from the frame $c'$ which supports the hopper C are spaced hangers 4 to the lower extremities of which is pivoted a conduit E. The conduit E is preferably of the extensible type, comprising a number of telescopic sections and thus may be shortened or lengthened as required. An operating rope $e$ is connected to the lower portion of the conduit E and passes over a pulley 8 on the arm 5 thence rearwardly around the pulley 7 and over the pulley $e'$ into the silo. The ropes $e$ and 6 are therefore capable of manipulation by the operator within the silo, this being advantageous in the operation of discharging material from the latter since the chute D may be readily positioned opposite the openings A' as the level of the contents in the container is lowered. If desired the connection intermediate the conduit E and the support B may be such as to admit of an outward swinging of the conduit as well as sidewise swinging.

Having thus described the invention, what is claimed as new is:—

1. In discharge means of the type described, the combination of spaced vertical guides, a movable support mounted to operate on said guides, said support comprising a frame having guiding means at opposite portions thereof engaging the guides above referred to, arms projecting outwardly from said frame, a chute pivotally supported by said arms at a point spaced from the guides whereby the chute may be moved into a vertical position spaced a considerable distance from the guides, the free end of the chute being movable into a position resting upon the frame aforesaid, and means for raising and lowering the movable support.

2. In discharge means of the type described, the combination of a silo having openings at intervals vertically of the same, guides at opposite sides of said openings, a movable support comprising a frame and supporting arms and mounted to move lengthwise of the guides aforesaid, a conduit carried by said support in spaced relation to the guides, and a chute movably mounted on the said movable support so as to assume a position opposite a selected one of the openings of the silo and supply material to the conduit, and a connection between the chute and the movable support permitting movement of the chute into a position spaced throughout its length from the guides, for the purpose described.

3. In discharge means of the type described, the combination of a silo having openings at intervals vertically of the same, guides at opposite sides of said openings, a movable support comprising a frame and supporting arms and mounted to move lengthwise of the guides aforesaid, a conduit carried by said support in spaced relation to the guides, and a chute movably mounted on the said movable support so as to assume a position opposite a selected one of the openings of the silo and supply material to the conduit, a connection between the chute and the movable support permitting movement of the chute into a position spaced throughout its length from the guides for the purpose described, and operating means in the silo connected with the conduit to move the latter into different positions and also connected with the movable support to move the later longitudinally of the guides on which it is mounted.

4. In combination, a silo having openings at intervals vertically thereof, guides at opposite sides of the openings, a movable support mounted on said guides and comprising a frame between the guides, means on the frame connecting the support to the guides, arms projecting outwardly from the frame, a hopper carried by the outer ends of said arms in spaced relation to the guides, a conduit pivotally supported at its upper end by said arms, a chute normally received at its inner end within the frame aforesaid and supported at said end by said frame, said chute communicating with the hopper above mentioned, a pivotal connection between the chute and the hopper permitting of movement of the chute into a vertical position substantially parallel with the silo, and operating means connected with the carriage and with the movable support and with the conduit for moving the same in relation to the silo.

In testimony whereof I affix my signature in presence of two witnesses.

EDGAR J. VASEY.

Witnesses:
  HOWARD KOCH,
  S. W. SCHOOLEY.